United States Patent
Turchi et al.

(10) Patent No.: US 8,830,644 B2
(45) Date of Patent: Sep. 9, 2014

(54) METHOD FOR PROVIDING OVER CURRENT PROTECTION AND CIRCUIT

(75) Inventors: Joel Turchi, Gagnac sur Garonne (FR); Stéphanie Conseil, Colomiers (FR); Radim Mlcousek, Frenstat pod Radhostem (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 399 days.

(21) Appl. No.: 13/264,154

(22) PCT Filed: Apr. 28, 2009

(86) PCT No.: PCT/US2009/041985
§ 371 (c)(1),
(2), (4) Date: Oct. 12, 2011

(87) PCT Pub. No.: WO2010/126491
PCT Pub. Date: Nov. 4, 2010

(65) Prior Publication Data
US 2012/0039007 A1    Feb. 16, 2012

(51) Int. Cl.
*H02H 7/00*   (2006.01)
*H02M 3/158*  (2006.01)

(52) U.S. Cl.
CPC .................. *H02M 3/1584* (2013.01)
USPC ............................................. 361/87

(58) Field of Classification Search
USPC ............................................. 361/87
See application file for complete search history.

(56) References Cited

U.S. PATENT DOCUMENTS

| | | | | |
|---|---|---|---|---|
| 4,958,108 | A | * | 9/1990 | Jorgensen ........................ 315/307 |
| 5,534,755 | A | * | 7/1996 | Deavenport et al. ............ 315/307 |
| 6,841,979 | B2 | * | 1/2005 | Berson et al. ................... 323/282 |

OTHER PUBLICATIONS

Renesas, R2A20112SP/DD, "Critical Conduction Mode Interleaved PFC Control IC", REJ03D0904-0200 Rev.2.00, Nov. 13, 2007.
Texas Instruments, UCC28060, Natural Interleaving Dual-Phase Transition-Mode PFC Controller, slus767e—May 2007—Rev. Nov. 2008 www.ti.com.

* cited by examiner

*Primary Examiner* — Stephen W Jackson
(74) *Attorney, Agent, or Firm* — Rennie William Dover

(57) ABSTRACT

A method and circuit for protecting against an over current condition. A conduction time of one or more transistors is reduced during the over current condition. The conduction time is reduced in an amount that is an increasing function of the amount of the over current. The conduction time may be reduced proportionally to the excess current.

23 Claims, 2 Drawing Sheets

METHOD FOR PROVIDING OVER CURRENT PROTECTION AND CIRCUIT

TECHNICAL FIELD

The present invention relates, in general, to power supplies and, more particularly, to interleaved power factor correction stages in power supplies.

BACKGROUND

Voltage regulators that provide AC/DC rectification typically include a full wave voltage rectifier stage, such as, for example, a diode bridge, a main Switch Mode Power Supply (SMPS) stage, and a Power Factor Correction (PFC) stage inserted between the line and the main SMPS. The SMPS provides regulation of an output waveform and the PFC stage draws a sinusoidal current from the line and provides Direct Current (DC) voltage to the main SMPS. Depending on the desired output power, the PFC stage may include a large inductor. However, large inductors are unsuitable for use in systems such as, for example, Liquid Crystal Display (LCD) television power supplies, in which it is desirable to use components having low profiles. To decrease the size of the magnetic components of a PFC stage and thereby lower their profile, manufacturers split the PFC stage into smaller parallel sub-stages that operate out of phase from each other. When the PFC stage is split into two parallel sub-stages they operate 180 degrees out of phase from each other. This configuration is referred to as being an interleaved PFC. Generally, the two PFC sub-stages operate in Critical Conduction Mode (CRM). Because the two PFC sub-stages are out-of-phase from each other, the total input current has the shape of a continuous conduction mode PFC which results in a lower input/output Root Mean Square (RMS) current and easier Electromagnetic Interference (EMI) filtering of the power supply.

In SMPS stages it is important to protect transistors such as power Metal Oxide Semiconductor Field Effect Transistors (MOSFETS) from over current conditions. This may be accomplished by comparing the current flowing through the power MOSFETS with a reference current. If the current is too high, the MOSFETS are turned off. For an interleaved PFC stage, there are two current branches operating independently with a 180 degree phase shift, where each current branch is driven by a MOSFET. If there are two input/output pins, each current branch is associated with a corresponding input/output pin. If a current is too high in a current branch, the controller of the PFC turns off the MOSFET associated with that current branch. If there is a single current sense input/output pin, the current sensed is the total current flowing through both power MOSFETS. When the total current exceeds the reference limit, both MOSFETS are turned off at the same time. Because the two MOSFETs operate out of phase, the current may not be equally distributed between them at the moment the over current is detected. For example, one MOSFET may be conducting most of the current whereas the other MOSFET conducts almost zero current. Thus, during an over current event, one phase delivers all the power while the other phase provides almost none of the power. A disadvantage of this is that it leads to inefficient operation of the power supply, e.g., the power supply may have a longer startup time or poor current conduction.

Accordingly, it would be advantageous to have a circuit and method for protecting the MOSFETS from an over current event. It would of further advantage for the circuit and method to improve the current sharing of the PFC branches during an over current event.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Figure 1:
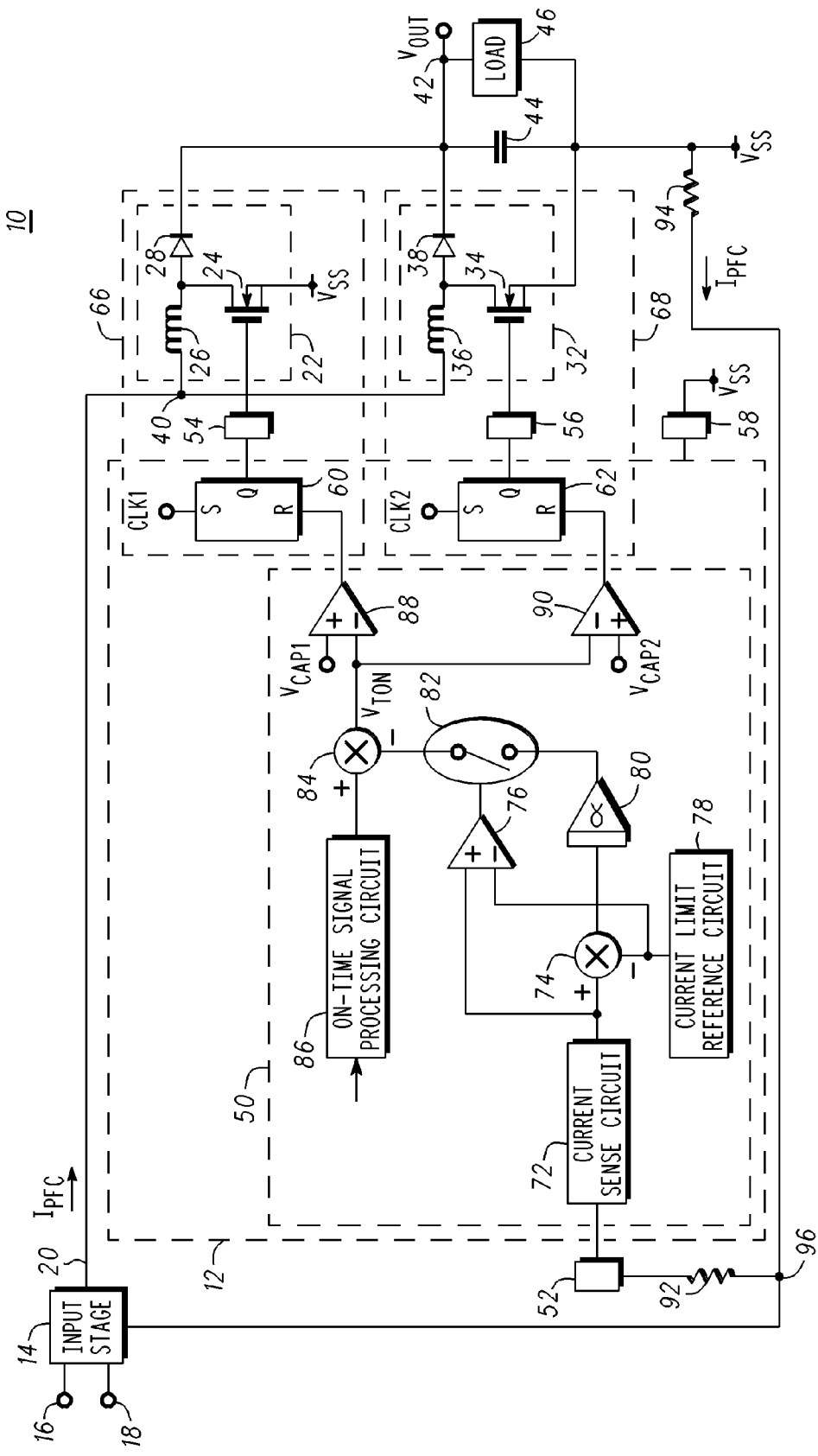
FIG. 1 is a schematic diagram of a power factor correction circuit having an over current protection stage in accordance with an embodiment of the present invention.

FIG. 1 is a schematic diagram of a portion of a Switch Mode Power Supply (SMPS) 10 that includes a Power Factor Correction (PFC) controller or PFC control circuit 12 connected to an input stage 14 and to output drive stages 22 and 32. PFC controller 12 is also referred to as a PFC control circuit and output drive stages 22 and 32 are also referred to as drive stages or drive circuits. Input stage 14 has inputs 16 and 18 coupled for receiving an Alternating Current (AC) signal from an AC line and an output 20 coupled for transmitting a rectified input signal to output drive stages 22 and 32. Output drive stage 22 is comprised of a circuit element 24, an inductor 26, and a diode 28 and output drive stage 32 is comprised of a circuit element 34, an inductor 36, and a diode 38. By way of example, circuit elements 24 and 34 are field effect transistors such as, for example, MOSFETS and power Field Effect transistors (FETS). The drain of MOSFET 24 is commonly connected to a terminal of inductor 26 and to the anode of diode 28 and the drain of MOSFET 34 is commonly connected to a terminal of inductor 36 and to the anode of diode 38. The other terminal of inductor 26 and the other terminal of inductor 36 are commonly connected together to form a node 40, which node 40 is connected to output 20 of input stage 14. The cathodes of diodes 28 and 38 are commonly connected to form an output node 42. An output signal $V_{OUT}$ is generated at output node 42. The sources of MOSFETS 24 and 34 are coupled for receiving a source of operating potential such as, for example $V_{SS}$. A capacitor 44 and a load 46 are coupled between output node 42 and source of operating potential $V_{SS}$. By way of example operating potential $V_{SS}$ is ground potential.

PFC controller 12 is comprised of an over current protection circuit 50 coupled to Pulse Width Modulator (PWM) latches 60 and 62 and has input/output nodes 52, 54, 56, and 58. Input/output nodes 52, 54, 56, and 58 may be input/output pins and therefore may be referred to as input/output pins. PWM latches 60 and 62 each have a set input (S), a reset input (R), and an output (Q). Set input S of PWM latch 60 is coupled for receiving a clock signal CLK1 and output Q is coupled to the gate of MOSFET 24 through input/output node 54. Set input S of PWM latch 62 is coupled for receiving a clock signal CLK2 and output Q is coupled to the gate of MOSFET 34 through input/output node 56. Input/output node 58 is coupled for receiving a source of operating potential such as, for example, $V_{SS}$. PWM latch 60 and output drive stage 22 cooperate to form a PFC stage 66 and PWM latch 62 and output drive stage 32 cooperate to form a PFC stage 68. Preferably, PFC stages 66 and 68 are interleaved. For the sake of clarity, outputs Q of latches 60 and 62 are shown as being directly connected to the gates of MOSFETS 24 and 34, respectively. However, it should be understood that latches 60 and 62 may not be directly connected to MOSFETS 24 and 34, respectively, but that intermediate stages or buffers may be included. Preferably, the intermediate stages or buffers have a current capability that allow efficiently turning on and turning off MOSFETS 24 and 34. Additional circuit elements such as, for example, resistors may be further included to control the switching speeds of MOSFETS 24 and 34.

Over current protection circuit 50 is comprised of a current sense circuit 72 having an input connected to input/output node 52 and an output commonly connected to a summing input of a summer 74 and to a non-inverting input of a comparator 76. A current limit reference 78 has an output commonly connected to a subtracting input of summer 74 and to an inverting input of comparator 76. An output of summer 74 is connected to an input of a current gain stage 80 having a gain α. By way of example, α is 0.5. The output of current gain stage 80 is connected to a current conduction terminal of a switch 82 and the output of comparator 76 is connected to a control terminal of switch 82. The other current conduction terminal of switch 82 is connected to a subtracting input of summer 84. An output of on-time signal processing circuit 86 is connected to a summing input of summer 84. An output of summer 84 is commonly connected to the inverting inputs of PWM comparators 88 and 90. The non-inverting input of PWM comparator 88 is coupled for receiving a capacitance voltage $V_{CAP1}$ and the non-inverting input of PWM comparator 90 is coupled for receiving a capacitance voltage $V_{CAP2}$.

SMPS 10 further includes an over current protection resistor 92 having a terminal commonly connected to input/output node 52 and to a terminal of a current sense resistor 94 to form a node 96. The other terminal of current sense resistor 94 is coupled for receiving a source of operating potential such as, for example, $V_{SS}$.

Figure 2:
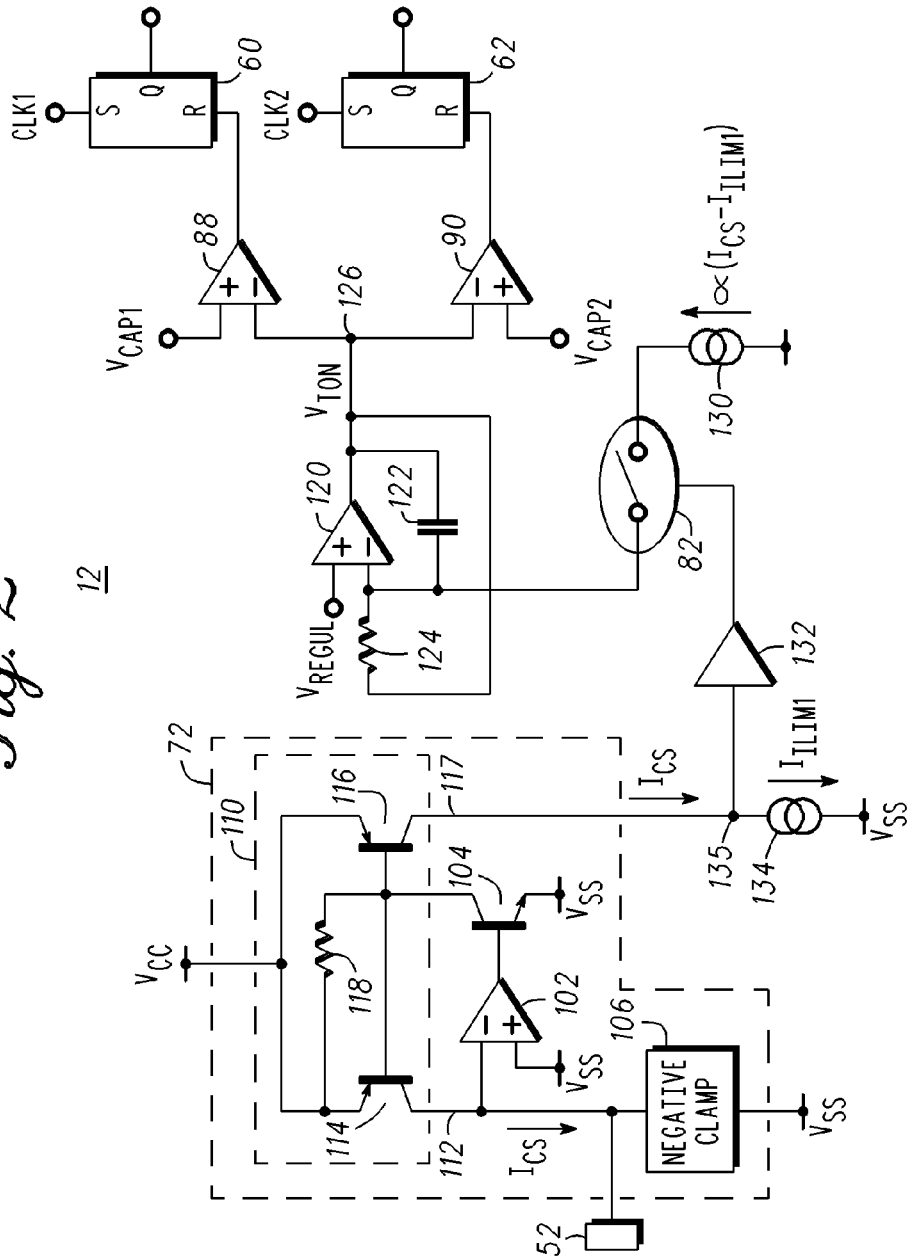
FIG. 2 is a schematic diagram of the over current protection stage of FIG. 1 in accordance with an embodiment of the present invention.

Referring now to FIG. 2, a schematic diagram of PFC control circuit 12 illustrated in FIG. 1 is shown. As discussed above, PFC control circuit 12 is comprised of over current protection circuit 50, which includes current sense circuit 72 and current limit reference 78. In accordance with an embodiment of the present invention, current sense circuit 72 is comprised of an operational amplifier 102 having a non-inverting input coupled for receiving a reference voltage $V_{SS}$ and an inverting input connected to input/output node 52. An output of operational amplifier 102 is connected to a base terminal of a bipolar junction transistor 104. The emitter of bipolar junction transistor 104 is coupled for receiving a source of operating potential such as, for example, $V_{SS}$. A clamp circuit 106 is connected to input/output node 52. A current mirror 110 has a terminal 112 connected to input/output node 52, an input connected to the collector of bipolar junction transistor 104, and an output connected to current limit reference circuit 78 (shown as current source 134 in FIG. 2). By way of example, current mirror 110 is comprised of PNP bipolar junction transistors 114 and 116 wherein the bases of bipolar junction transistors 114 and 116 are commonly connected together and the emitters of bipolar junction transistors 114 and 116 are commonly connected together and for receiving a source of operating potential $V_{CC}$. The emitter and base of bipolar junction transistor 114 are coupled together through a resistor 118. The commonly connected bases of bipolar junction transistors 114 and 116 are connected to the drain of NPN bipolar junction transistor 104. The collector of bipolar junction transistor 116 serves as an output 117 of current mirror 110. It should be noted that the circuit configuration shown and described for current sense circuit 72 is an example that is included merely for the sake of clarity. Alternative examples of circuit configurations include circuits that measure the current that forces a virtual zero voltage at input/output node 52 and mirror this current to node 135.

Over current protection circuit 50 further includes an operational amplifier 120 having a capacitor 122 coupled between the output of operational amplifier 120 and its inverting input. A resistor 124 is connected between the inverting input of operational amplifier 120 and its output, i.e., node 126. Thus operational amplifier 120 is configured as a follower. A terminal of capacitor 122 is connected to the inverting input of operational amplifier 120 and the other terminal of capacitor 122 is connected to the inverting inputs of PWM comparators 88 and 90 and to the output of operational amplifier 120 forming a node 126. Control signal $V_{TON}$ appears at node 126. A non-inverting input of operational amplifier 120 is coupled for receiving a voltage $V_{REGUL}$. It should be noted that voltage $V_{REGUL}$ is a regulation signal resulting from the amplification of the error between the actual voltage appearing at output node 42 and its desired value for regulation as provided by a regulation block (not shown). Thus, control signal $V_{TON}$ is generated from voltage $V_{REGUL}$ which serves as an error correction signal. A current source 130 is coupled to the inverting input of operational amplifier 120 through switch 82 and transmits a current substantially equal to the product of a gain factor a and the difference between currents $I_{CS}$ and $I_{ILIM1}$, i.e., α*($I_{CS}$-$I_{ILIM1}$). An input of a current comparator 132 is commonly connected to output 117 of current mirror 110 and to a current source 134 to form a node 135. Current source 134 sinks a current $I_{ILIM1}$ and is referred to as a current sink. An output of current comparator 132 is connected to a control terminal of switch 82. The output of current mirror 110 that is commonly connected to the input of current comparator 132 and to current source 134 sources a current $I_{CS}$.

In operation and referring to FIG. 1, an AC signal is received at inputs 16 and 18 of input stage 14, which generates an output current $I_{PFC}$ at output 20. Current $I_{PFC}$ flows through output drive stages 22 and 32 and is returned through resistor 94. Resistor 94 generates a negative current sense voltage $V_{CS}$ which is proportional to current $I_{PFC}$. PFC control circuit 12 monitors voltage $V_{CS}$ to detect when current $I_{PFC}$ exceeds a predetermined level. Current sense circuit 72 generates a current $I_{CS}$ that is substantially equal to the product of current $I_{PFC}$ and the ratio of the resistor values for resistors 94 and 92, i.e., $I_{CS}=I_{PFC}*(R_{94}/R_{92})$, where $R_{94}$ is the resistance value of resistor 94 and $R_{92}$ is the resistance value of resistor 92. Current $I_{CS}$ is transmitted to the inverting input of comparator 76 and to the summing input of summer 74. The conduction times of MOSFETS 24 and 34 of output drive stages 22 and 32, respectively, are controlled by a control signal $V_{TON}$ appearing at the inverting inputs of PWM comparators 88 and 90. Control signal $V_{TON}$ is further described below.

Current limit reference circuit 78 sinks a current $I_{ILIM1}$ from summer 74, i.e., a negative current $I_{ILIM1}$ appears at the subtracting input of summer 74. Current $I_{ILIM1}$ is a maximum desired current flowing in SMPS 10 and may be identified as current $I_{ILIM1}$ or current $I_{REF}$. In addition, current $I_{ILIM1}$ is transmitted to the inverting input of comparator 76. In response to currents $I_{CS}$ and $I_{ILIM1}$ appearing at its inputs, comparator 76 generates a control voltage that controls the state of switch 82. If current $I_{CS}$ is less than current $I_{ILIM1}$, switch 82 is open and if current $I_{CS}$ is greater than current $I_{ILIM1}$, switch 82 is closed. When switch 82 is open, the current amplified by amplifier 80 does not flow. When switch 82 is closed, the current generated by amplifier 80 is transmitted to the subtracting input of summer 84 Amplifier 80 generates a current substantially equal to the product of a gain factor a and the difference between currents $I_{CS}$ and $I_{ILIM1}$. Thus, amplifier 80 generates a current $I_{SHIFT}=\alpha*(I_{CS1}-I_{ILIM1})$. It should be noted that the configuration of the circuitry for generating current $I_{SHIFT}$ is not a limitation of the present invention. For example, switch 82 and current comparators 76 and 132 (shown in FIGS. 1 and 2, respectively) may be omitted from embodiments in which gain stage 80 or current source 130 generate current $I_{SHIFT}$ when current $I_{CS}$ is greater than current $I_{ILIM1}$. Thus, other embodiments of PFC control circuits 12 may include current comparators, switches, current gain stages, or combinations thereof that inject a current $I_{SHIFT}$ when current $I_{CS}$ is greater than current $I_{ILIM1}$. It should be further noted that current $I_{SHIFT}$ is not limited to being a current that is the product of a gain factor, e.g., $\alpha$, and the difference between currents $I_{CS}$ and $I_{ILIM1}$. Current $I_{SHIFT}$ may be generated such that it is an increasing function of the amount by which current $I_{CS}$ exceeds current $I_{ILIM1}$. For example, current $I_{SHIFT}$ may be the product of gain factor $\alpha$ and the square of the difference between currents $I_{CS}$ and $I_{ILIM1}$, i.e., $I_{SHIFT}=\alpha*(I_{CS}-I_{ILIM1})^2$.

On-time signal processing circuit 86 generates a control voltage or control signal $V_{TON}$ which appears at the input of summer 84. If switch 82 is open, control voltage $V_{TON}$ is input into the inverting inputs of PWM comparators 88 and 90. A sawtooth voltage signal $V_{CAP1}$ from a timing capacitor (not shown) is input into the non-inverting input of PWM comparator 88, which generates an input signal at reset input R of PWM latch 60. Likewise, a sawtooth voltage signal $V_{CAP2}$ from a timing capacitor (not shown) is input into the non-inverting input of PWM comparator 90, which generates an input signal at reset input R of PWM latch 62. Clock signals CLK1 and CLK2 are input at set inputs S of PWM latches 60 and 62, respectively. PFC control circuit 12 generates control signals that control the conduction times of MOSFETS 24 and 34. In response to the output signals from latches 60 and 62, MOSFETS 24 and 34 generate an output signal $V_{OUT}$ at output node 42.

If current $I_{CS}$ is greater than reference current $I_{REF}$, an over current condition exists. As discussed above, under this condition switch 82 is closed and amplifier 80 injects current $I_{SHIFT}$ into summer 84, which then shifts the value of voltage $V_{TON}$. When current $I_{CS}$ is greater than current $I_{ILIM1}$, output current $I_{SHIFT}$ and on-time signal processing circuit 86 cooperate to lower control voltage $V_{TON}$. As discussed above, sawtooth voltage signals $V_{CAP1}$ and $V_{CAP2}$ from timing capacitors (not shown) are input into the non-inverting inputs of PWM comparators 88 and 90, which generate signals for PWM latches 60 and 62, respectively. PFC control circuit 12 generates control signals that control the conduction times of MOSFETS 24 and 34. Because, control voltage $V_{TON}$ controls the output voltage levels of PWM comparators 88 and 90, it controls the output signals of PWM latches 60 and 62 and thereby the conduction times of MOSFETS 24 and 34.

FIG. 2 illustrates an embodiment of PFC controller 12 in which operational amplifier 102 uses NPN bipolar junction transistor 104 to source a current that maintains the voltage at input/output node 52 in the range of voltage $V_{SS}$. Resistor 92 is inserted between input/output node 52 to adjust the current $I_{CS}$ flowing through input terminal 112. A current $I_{CS}$ flowing through input/output node 52 is mirrored to output 117 of current mirror 110 and flows toward node 135. Current $I_{CS}$ is compared to a reference or threshold current $I_{ILIM1}$. In addition, current source 134 sinks a current $I_{ILIM1}$ from node 135. As discussed above, current $I_{ILIM1}$ is a maximum desired current flowing in SMPS 10 and may be identified as current $I_{ILIM1}$ or current $I_{REF}$. If current $I_{CS}$ is less than reference current $I_{ILIM1}$, current comparator 132 generates a logic low voltage that opens switch 82 or maintains switch 82 in an open position if it was already at a logic low voltage level. Current comparator 132 compares current $I_{CS}$ with current $I_{ILIM1}$ and generates a control signal that opens or closes switch 82. Current comparator 132 is analogous to comparator 76 of FIG. 1. Because an over current condition is not occurring, operational amplifier 120 generates a control signal $V_{TON}$ that is at a nominal value. Control signal $V_{TON}$ is input into the inverting inputs of PWM comparators 88 and 90. Sawtooth voltage signals $V_{CAP1}$ and $V_{CAP2}$ from timing capacitors (not shown) are input into the non-inverting inputs of PWM comparators 88 and 90, which comparators 88 and 90 generate an input signals for reset inputs R of PWM latches 60 and 62. Clock signals CLK1 and CLK2 are input to set inputs S of PWM latches 60 and 62, respectively. PWM latches 60 and 62 transmit control signals that control the conduction times of MOSFETS 32 and 34. In response to the output signals from latches 60 and 62, MOSFETS 24 and 34 generate an output signal $V_{OUT}$ at output node 42.

If current $I_{CS}$ is greater than reference current $I_{REF}$, an over current condition exists. In response to the over current condition, current comparator 132 generates a logic high voltage at its output, which closes switch 82. By closing switch 82, a current $I_{SHIFT}$ from current source 130 is injected into the inverting input terminal of operational amplifier 120. The current from current source 130 has a value substantially equal to the product of the gain factor a and the difference between current $I_{CS}$ and a reference current $I_{ILIM1}$. Operational amplifier 120 strives to maintain input voltage $V_{IN+}$ appearing at the non-inverting input of operational amplifier 120 equal to input voltage $V_{IN-}$ appearing at the inverting input of operational amplifier 120. Accordingly, operational amplifier 120 reduces or lowers the voltage at the output of operational amplifier 120, i.e., it reduces voltage $V_{TON}$. As discussed above, sawtooth voltage signals $V_{CAP1}$ and $V_{CAP2}$ from timing capacitors (not shown) are input into the non-inverting inputs of PWM comparators 88 and 90, which generate signals for PWM latches 60 and 62. Clock signals CLK1 and CLK2 are input to set inputs S of PWM latches 60 and 62. PFC control circuit 12 generates control signals that control the conduction times of MOSFETS 24 and 34. Because control voltage $V_{TON}$ controls the output voltage level of PWM comparators 88 and 90, it controls the output of PWM latches 60 and 62 and thus the conduction times of MOSFETS 24 and 34.

By now it should be appreciated that an over current protection circuit and a method for protecting an SMPS from an over current have been provided. In accordance with an embodiment, over current protection is provided by changing the conduction times of MOSFETS present in the PFC stage, rather than turning off these transistors. A control voltage or control signal $V_{TON}$ is reduced in a proportion that depends on the excess current flowing in the SMPS. Thus, control signal $V_{TON}$ is changed in accordance with the current flowing in the switch mode power supply. Control voltage $V_{TON}$ is transmitted to the PWM comparators to control the PWM latches. The output signals from the PWM latches are then used to control the conduction times of the MOSFETS of current drive stages 22 and 32.

Although specific embodiments have been disclosed herein, it is not intended that the invention be limited to the disclosed embodiments. Those skilled in the art will recognize that modifications and variations can be made without departing from the spirit of the invention. For example, rather than changing the control signal $V_{TON}$, the ramp signals can be varied in response to an over current protection signal, i.e., a signal from current comparator 132. It is intended that the invention encompass all such modifications and variations as fall within the scope of the appended claims.

What is claimed is:

1. A method for protecting against an over current condition, comprising:
   generating a first control signal;
   changing a level of the first control signal in response to a third current, the third current generated in response to a first current exceeding a second current;
   comparing the first control signal with a first reference voltage and a second reference voltage to generate a second control signal and a third control signal, respectively;
   changing a conduction time of a circuit element of a plurality of circuit elements in response to at least one of the second control signal and the third control signal, wherein the conduction time is changed in accordance with the amount by which the first current exceeds the second current.

2. The method of claim 1, further including comparing the first current to the second current.

3. The method of claim 2, wherein changing the conduction time includes reducing the conduction time of the circuit element of the plurality of circuit elements.

4. The method of claim 3, wherein reducing the conduction time of the circuit element comprises varying a gate signal of one or more transistors.

5. The method of claim 1, wherein reducing the conduction time of the circuit element comprises varying a ramp signal of the circuit element.

6. The method of claim 1, further including amplifying a difference between the first current and the second current.

7. The method of claim 1, further including amplifying a square of the difference between the first current and the second current.

8. The method of claim 7, wherein changing the conduction time of the circuit element comprises changing the conduction time of at least one transistor of a plurality of transistors.

9. A method for protecting against an over current condition, comprising:
   providing a first input signal at a non-inverting input of an operational amplifier;
   providing a second input signal at an inverting input of the operational amplifier, the operational amplifier configured as a follower;
   injecting a current into the inverting input to reduce an output voltage appearing at the output of the operational amplifier; and
   changing a conduction time of a circuit element of a plurality of circuit elements in response to a first current exceeding a second current, wherein the conduction time is reduced proportionally in an amount that is an increasing function of the amount by which the first current exceeds the second current.

10. A method for protecting a circuit from an over current condition, comprising:
    generating a first current in response to an input signal and generating a first control signal;
    generating a second current and a third current in response to the first current;
    changing a level of the first control signal in response to the second current being greater than the third current, wherein an amount that the second current is greater than the third current is an over current, and wherein changing the level of the first control signal generates a modified first control signal;
    using the first modified first control signal to generate a second control signal and a third control signal; and
    changing a conduction time of at least one transistor in response to at least one of the second control signal and the third control signal, wherein the conduction time is changed in an amount that is an increasing function of the amount of the over current.

11. The method of claim 10, further including determining the over current by comparing a first current to a second current.

12. The method of claim 11, wherein the over current is a difference between the first current and the second current.

13. The method of claim 10, wherein the first current is a mirrored current and the second current is a reference current.

14. The method of claim 10, further including multiplying the over current by a gain factor.

15. The method of claim 10, wherein changing the conduction time of the at least one transistor comprises reducing the conduction time.

16. The method of claim 15, wherein reducing the conduction time includes injecting current into a follower.

17. The method of claim 10, wherein changing the conduction time includes comparing a ramp signal with a control signal.

18. The method of claim 17, wherein changing the conduction time includes reducing the on-time of the at least one transistor by changing the ramp signal or the control signal.

19. An over current protection circuit of a power factor correction circuit, comprising:
    a first pulse width modulation comparator having an inverting input, a non-inverting input, and an output;
    a summer having at least first and second inputs and an output, the output connected to the inverting input of the pulse width modulation comparator;
    an on-time signal processing circuit having an output coupled to the first input of the summer;
    a current injection circuit coupled to the second input of the summer; and
    a first pulse width modulation latch having a reset input coupled to the output of the pulse width modulation comparator.

20. An over current protection circuit, comprising:
    a first pulse width modulation comparator having an inverting input, a non-inverting input, and an output;
    an operational amplifier having an inverting input, a non-inverting input, and an output, the output of the operational amplifier coupled to the inverting input of the first pulse width modulation comparator;
    a capacitor coupled between the inverting input and the output of the operational amplifier;
    a switch having first and second current conducting terminals and a control terminal, the first current conducting terminal coupled to the inverting input of the operational amplifier;
    a first current source coupled to the second current conducting terminal of the switch;
    a current comparator having an input and an output, the output coupled to the control terminal of the switch;
    a second current source coupled to the input of the current comparator;
    a current sink coupled to the input of the current comparator; and
    a first pulse width modulation latch having a reset input coupled to the output of the pulse width modulation comparator.

21. The over current protection circuit of claim 20, further including:
- a resistor coupled between the output and the inverting input of the operational amplifier;
- a second pulse width modulation comparator having an inverting input, a non-inverting input, and an output, the output of the operational amplifier coupled to the inverting input of the second pulse width modulation comparator; and
- a second pulse width modulation latch having a reset input coupled to the output of the pulse width modulation comparator.

22. The over current protection circuit of claim 19, further including:
- a second pulse width modulation comparator having an inverting input, a non-inverting input, and an output, the output of the summer coupled to the inverting input of the second pulse width modulation comparator; and
- a second pulse width modulation latch having a reset input coupled to the output of the pulse width modulation comparator.

23. The over current protection circuit of claim 22, further including:
- a first output drive stage coupled to the output of the first pulse width modulation latch; and
- a second output drive stage coupled to the output of the second pulse width modulation latch.

* * * * *